US008412555B2

(12) United States Patent
Hamling (10) Patent No.: US 8,412,555 B2
(45) Date of Patent: Apr. 2, 2013

(54) METHODS AND SYSTEMS FOR PLANNING CONFIGURABLE MANUFACTURING CAPACITY

(76) Inventor: Daniel Thomas Hamling, San Diego, CA (US)

(*) Notice: Subject to any disclaimer, the term of this patent is extended or adjusted under 35 U.S.C. 154(b) by 331 days.

(21) Appl. No.: 12/390,409

(22) Filed: Feb. 21, 2009

(65) Prior Publication Data
US 2009/0216598 A1 Aug. 27, 2009

Related U.S. Application Data

(60) Provisional application No. 61/030,991, filed on Feb. 24, 2008.

(51) Int. Cl.
*G07G 1/10* (2006.01)
*G07G 1/12* (2006.01)
*G06Q 10/00* (2012.01)
*G06Q 20/00* (2012.01)
*G07B 15/00* (2011.01)

(52) U.S. Cl. .............. 705/7.25; 705/11; 705/13; 705/16

(58) Field of Classification Search .................. None
See application file for complete search history.

(56) References Cited

U.S. PATENT DOCUMENTS

| | | | | |
|---|---|---|---|---|
| 5,231,567 A * | 7/1993 | Matoba et al. | ............... | 700/100 |
| 5,757,680 A * | 5/1998 | Boston et al. | ................ | 702/121 |
| 6,925,062 B2 * | 8/2005 | Tanaka et al. | ............. | 370/241.1 |
| 7,024,330 B2 * | 4/2006 | Klinck | .......................... | 702/123 |
| 7,343,558 B2 * | 3/2008 | Kadota | ........................ | 715/725 |
| 7,590,903 B2 * | 9/2009 | Volkerink et al. | ............. | 714/725 |
| 7,617,015 B2 * | 11/2009 | Steinbach et al. | ............. | 700/97 |
| 2002/0035465 A1 * | 3/2002 | Sinclair | ........................ | 703/22 |
| 2002/0143598 A1 * | 10/2002 | Scheer | .............................. | 705/9 |
| 2003/0050817 A1 * | 3/2003 | Cargille et al. | ................... | 705/8 |
| 2004/0186603 A1 * | 9/2004 | Sanford et al. | .................. | 700/95 |
| 2005/0060622 A1 * | 3/2005 | Clark et al. | .................... | 714/724 |
| 2005/0114202 A1 * | 5/2005 | Chua et al. | ....................... | 705/10 |
| 2005/0229064 A1 * | 10/2005 | Guidry | ........................... | 714/742 |
| 2006/0005157 A1 * | 1/2006 | Saxena et al. | ................. | 717/101 |
| 2006/0053069 A1 * | 3/2006 | Ebel et al. | ........................ | 705/28 |
| 2006/0161465 A1 * | 7/2006 | Ramakrishnan | .................. | 705/7 |
| 2006/0200714 A1 * | 9/2006 | Kamano et al. | ............... | 714/718 |
| 2008/0103715 A1 * | 5/2008 | Tsuda et al. | .................... | 702/81 |
| 2010/0064763 A1 * | 3/2010 | Gaikwad et al. | ............... | 73/1.01 |

OTHER PUBLICATIONS

Almeida, D. & Kellert, P. (2001). A workload data aggregation process for flexible manufacturing system modeling using queuing network models. Int'l J. of Flexible Manufacturing Systems 13(3), p. 309.*
Wu, S.H. & Nee, A.Y.C. (2001). Concurrent process planning and scheduling in distributed virtual manufacturing. IEE transactions 34, p. 77-89.*
Shen W. (2002). Distributed manufacturing scheduling using intelligent agents. IEEE Intelligent Systems Jan.-Feb., p. 88-94.*

(Continued)

*Primary Examiner* — Elaine Gort
*Assistant Examiner* — Peter L Ludwig (57) ABSTRACT

The present invention comprises methods and systems that provide manufacturing capacity configuration, allocation, and procurement plans based on manufacturing demand, operational constraints, and other user inputs. This is generally accomplished by modeling the capabilities of the equipment comprising the capacity at its lowest allowed level of configurability. By defining capacity requirements at those same or lower levels, configuration, allocation, and procurement plans can be generated from an aggregated capacity demand forecast. In addition, the present invention allows for constraints (e.g. special equipment limitations, demand priorities, temporal requirements, financial targets, etc.) from various business areas to be considered when generating the plans. Furthermore, for each plan, the present invention also identifies any needed and excess capacity—again described at the lowest allowed level of configurability—and generates expected manufacturing, financial, and other performance metrics.

5 Claims, 9 Drawing Sheets

OTHER PUBLICATIONS

Jiao, J et al. (2004). An agent-based framework for collaborative negotiation in the global manufacturing supply chain network. Robotics and Computer-Integrated Manufacturing 22, p. 239-255.*

Shen, W. et al. (2006). Agent-based distributed manufacturing process planning and scheduling: a state-of-the-art survey. IEEE Transactions on Systems, Man, and Cybernetics 36(4), 563-577.*

Wang, F et al. (2006). Knowledge-based multi-site capacity planning using agents. IEEE Int'l Conference on Industrial Informatics.*

The Collins English Dictions (10th ed.), Williams Collins Sons & Co. (1998) Retrieved from: www.dictionary.com/resource, citing to dictionary for definition of "resource".*

* cited by examiner

METHODS AND SYSTEMS FOR PLANNING CONFIGURABLE MANUFACTURING CAPACITY

FIELD OF INVENTION

The invention is related to methods and systems for managing manufacturing capacity, and more particularly to methods and systems that provide manufacturing capacity configuration, allocation, and procurement plans based on manufacturing demand, operational constraints, and other user inputs.

BACKGROUND OF INVENTION

The complexities and uncertainties associated with the manufacturing of semiconductor products ("chips") requires that some level of testing be performed on each chip before being shipped to customers. The extent of testing can range from sample testing for chips deploying straightforward designs and mature manufacturing processes, to several stages of lengthy, fully-functional, multi-temperature testing for chips using the latest technologies.

The automatic test equipment (ATE) used to perform the tests on semiconductor chips provide the stimulus to the chip, as well as capture and process the response from the chip, all under computer control. Since ATE must be able to source and capture many channels of the latest high-speed, smart-power, and high-precision signals, the ATE business model requires significant investments in research and development, applications engineering, and other support functions. The current industry average selling price for ATE is therefore in the range of $US0.5 million to $US1.5 million.

In order to manage the overall cost of test, ATE will typically be configured to have only the channels and capability needed to test a particular chip, making the manufacturing capacity provided by the ATE dedicated to a given chip, or at best, a chip family. Each ATE supplier, too, has a different architecture and set of channel attributes, adding another dimension of complexity and incompatibility to the test capacity. In addition, each chip has a unique list of required tests, making the cycle time through the test process chip-dependent. Furthermore, each chip requires a specific combination of peripheral components and equipment (e.g. interface fixtures and sockets, handling equipment and kits, etc.) that together with the ATE complete a full "test cell" of capacity. The many cells of semiconductor test capacity required today are therefore very diverse and non-uniform.

This variability makes it difficult for test providers to optimize the utilization of costly test assets and thus maximize their return on investment (ROI)—reducing the economic profits of not only the test provider, but also that of the test specifier and test equipment supplier. This issue is even more of a problem for the test subcontractor, whose founding business model relies on the efficient aggregation of test demand across a diverse set of test specifiers and their chips. The typically-cited one-third of test capacity that is unutilized accounts for an estimated US$1.8 billion of annual depreciation costs, a significant economic burden on the entire semiconductor test value chain.

The landscape of solutions related to semiconductor test generally addresses both low and high levels of operations abstraction, but leaves a conspicuous gap at the test capacity planning level. At the low level, the solutions ignore the chip's test capacity requirements and therefore cannot perform any of the test capacity planning functions needed to significantly improve ROI. Just above the low end are tools focused on overall equipment efficiency (OEE) which lack the demand aggregation and configuration management capabilities required of a value-adding test capacity planning solution. At the high level, well-known supply chain management, demand management, and business intelligence offerings treat test capacity simply as a "black box," precluding any useful planning functionality that accounts for the non-uniformity of test capacity. At the test capacity management level are numerous, incompatible, obvious and rudimentary spreadsheet solutions that severely lack the detailed modeling sophistication and resulting precision and accuracy that are needed today.

Thus, a solution is needed that enables sophisticated planning of configurable manufacturing capacity, like that which is used for testing of semiconductor chips.

SUMMARY OF INVENTION

The present invention delivers the ability to plan the configuration, allocation, and procurement of configurable manufacturing capacity.

In particular, the present invention comprises methods and systems that provide manufacturing capacity configuration, allocation, and procurement plans based on manufacturing demand, operational constraints, and other user inputs. This is generally accomplished by modeling the capabilities of the equipment comprising the capacity at its lowest allowed level of configurability. By defining capacity requirements at those same or lower levels, configuration, allocation, and procurement plans can be generated from an aggregated capacity demand forecast. In addition, the present invention allows for constraints (e.g. special equipment limitations, demand priorities, temporal requirements, financial targets, etc.) from various business areas to be considered when generating the plans. Furthermore, for each plan, the present invention also identifies any needed or excess capacity—again described at the lowest allowed level of configurability—and generates expected manufacturing, financial, and other performance metrics.

BRIEF DESCRIPTION OF DRAWINGS OF INVENTION

The accompanying drawings, which are incorporated in, and constitute a part of, this specification illustrate an embodiment of the invention and, together with the description, serve to explain the advantages and principles of the invention. In the drawings.

DETAILED DESCRIPTION OF PREFERRED EMBODIMENT OF INVENTION

FIGS. 1 to 8 represent various aspects of the preferred embodiment of methods and systems that provide manufacturing capacity configuration, allocation, and procurement plans based on manufacturing demand, operational constraints, and other user inputs.

System Architecture

Figure 1:
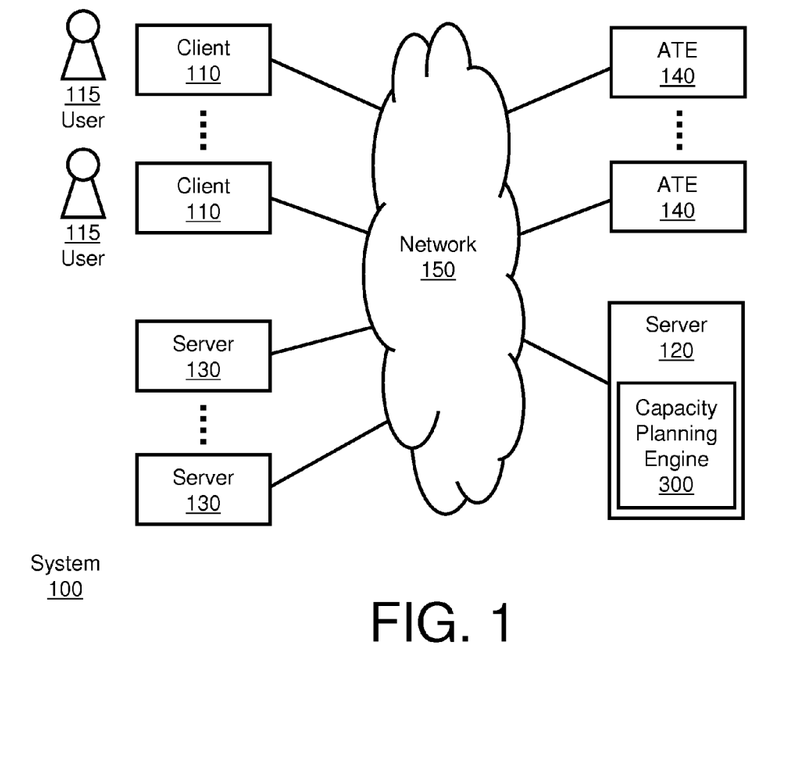
FIG. 1 illustrates a block diagram of the operating environment of the present invention.

FIG. 1 illustrates a system 100 in which methods consistent with the present invention may be implemented. System 100 includes multiple client devices 110, multiple servers 120 and 130, and multiple automatic test equipment (ATE) systems 140, all connected via a network 150. Network 150 shown comprises the Internet, but may also comprise other networks, such as an intranet or direct connections. Two client devices 110, one server 120, two servers 130, and two ATE systems 140 are shown as connected to network 150 for simplicity. Alternative embodiments may have different quantities of devices, servers, and systems than that shown. Also, client device 110 may perform the functions of server 120 or 130, and server 120 or 130 may perform the functions of client device 110. Moreover, methods according to the present invention may even operate within a single client device 110, server 120 or 130, or ATE system 140.

Through client devices 110, users 115 can communicate over network 150 with each other and with other devices and systems coupled to network 150. Examples of client devices 110 include mainframes, minicomputers, personal computers, laptops, digital assistants, personal digital assistants, cellular phones, mobile phones, smart phones, pagers, digital tablets, laptop computers, Internet appliances, or the like, capable of connecting to network 150. Client devices 110 transmit data over network 150 or receive data from network 150 via a wired, wireless, or optical connection.

Servers 120 and 130 include one or more types of computer systems, such as a mainframe, minicomputer, or personal computer, capable of communicating over network 150 with each other and with other devices and systems coupled to network 150. In other embodiments, servers 120 and 130 may include mechanisms for directly connecting to one or more client devices 110 or ATE systems 140. Servers 120 and 130 may also comprise multiple and/or distributed devices. Servers 120 and 130 transmit data over network 150 or receive data from the network 150 via a wired, wireless, or optical connection.

ATE systems 140 include one or more types of computer systems, such as a mainframe, minicomputer, or personal computer, capable of controlling the ATE operation and communicating over network 150 with each other and with other devices and systems coupled to network 150. ATE systems 140 transmit data over network 150 or receive data from the network 150 via a wired, wireless, or optical connection.

Figure 1A:
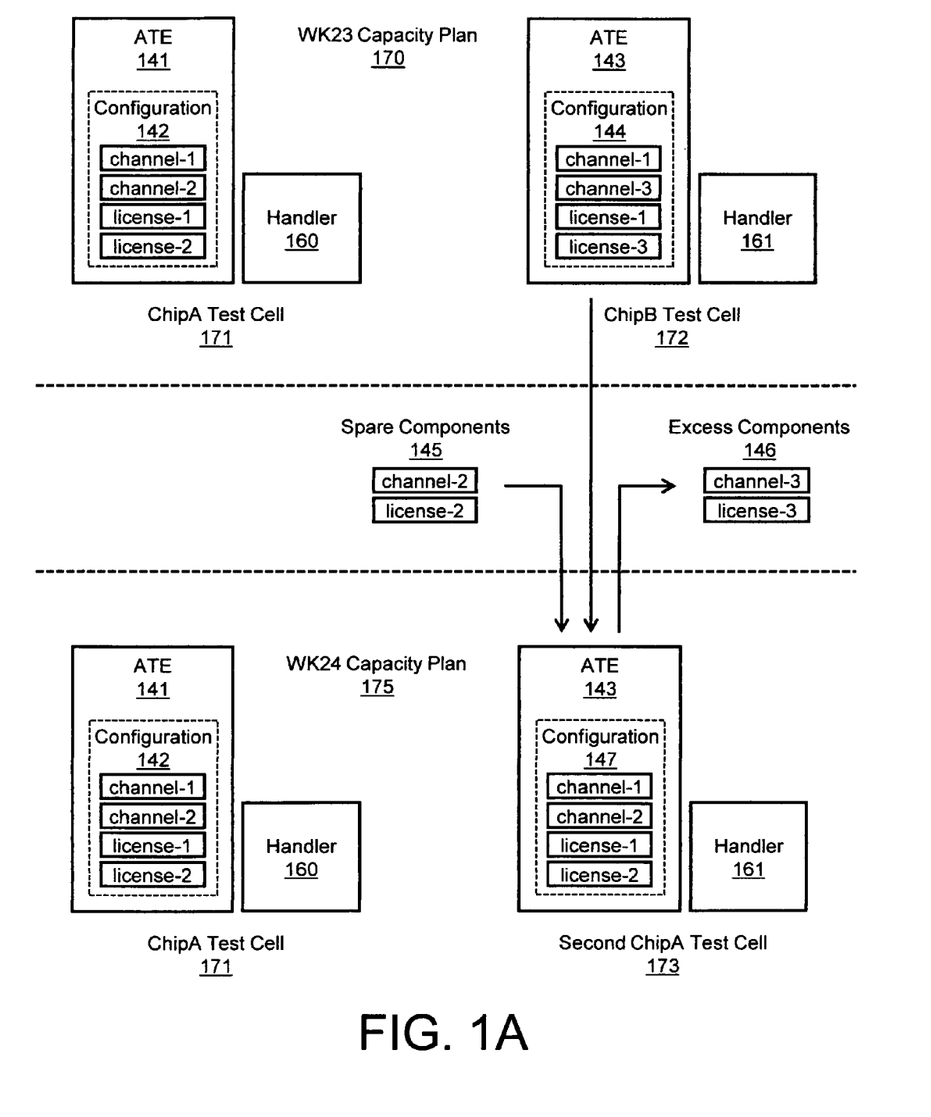
FIG. 1A illustrates the configurable manufacturing capacity of the present invention.

ATE systems 140 are also essential in this embodiment to the configurable manufacturing capacity for which the present invention generates plans. FIG. 1A illustrates the unique configurable capability of ATE and its use in planning two manufacturing test cells of capacity. WK23 capacity plan 170 requires that ChipA test cell 171 and ChipB test cell 172 are available to meet the demand for ChipA and ChipB. ChipA test cell 171 includes ATE system 141 with configuration 142, and handler 160. Configuration 142 is comprised of a unique set configurable components selected to provide the capability to test ChipA. Similarly, ChipB test cell 172 includes ATE system 143 with configuration 144, and handler 161, assumed to be equivalent in capability to handler 160. Configuration 144 is comprised of a unique set of configurable components selected to provide the capability to test ChipB. As the mix of chip demand changes, a different WK24 capacity plan 175 may be needed, requiring a second ChipA test cell 173 and eliminating the need for ChipB test cell 172.

By recognizing the configurable capability of ATE and examining the ATE capacity at its lowest level of configurability (i.e. the configurable components), the additional required capacity can be generated by reconfiguring existing available capacity. Specifically, as shown in the figure, second ChipA test cell 173 is created by adding spare components 145 to ATE system 143 and removing excess components 146 from ATE system 143, creating a new configuration 147 with capability equivalent to that of configuration 142 and thus capable of testing ChipA. Spare components 145 could be actual standalone components, but will more likely come from other ATE systems. Likewise, excess components 146 will likely be planned for other ATE systems that need the capability provided by some or all of excess components 146 for testing other chips. Configuration rules at the test cell or ATE configuration level, as well as the transferability or transferable nature of ATE system 143, spare components 145, and handler 161 will play a role in determining the feasibility of the reconfiguration performed to create second ChipA test cell 173. For example, license components are easily transferred electronically worldwide, whereas channel board components and certainly the significantly larger and heavier complete ATE systems require much more time and expense to physically move from one location to another.

Figure 2:
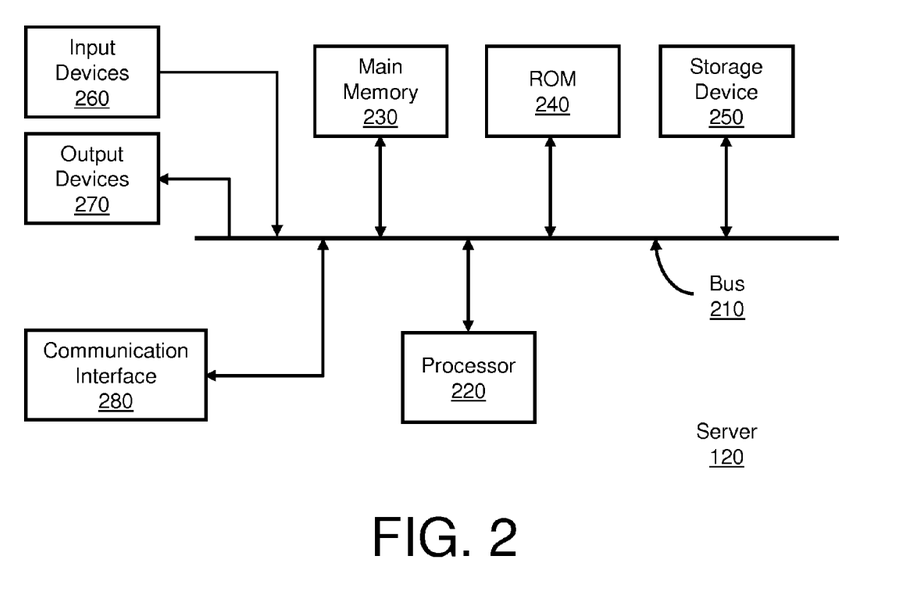
FIG. 2 illustrates a block diagram of the server of the present invention.

FIG. 2 illustrates the block diagram of server 120 consistent with the present invention. Server 120 includes a bus 210, a processor 220, a main memory 230, a read only memory (ROM) 240, a storage device 250, an input device 260, an output device 270, and a communication interface 280.

Bus 210 includes one or more conventional buses that permit communication among the components of server 120. Processor 220 includes any type of conventional processor or microprocessor that interprets and executes instructions. Main memory 230 includes a random access memory (RAM) or another type of dynamic storage device that stores information and instructions for execution by processor 220. ROM 240 includes a conventional ROM device or another type of static storage device that stores static information and instructions for use by processor 220. Storage device 250 includes a magnetic and/or optical recording medium and its corresponding drive.

Input device 260 includes one or more conventional mechanisms that permit information to be delivered to server 120, such as a keyboard, a mouse, a pen, voice recognition and/or biometric mechanisms, and the like. Output device 270 includes one or more conventional mechanisms that output information, such as a display, a printer, a speaker, and the like. Communication interface 280 includes any transceiver-like mechanism that enables server 120 to communicate with other devices and/or systems, directly and/or via a network, such as network 150.

As will be described in detail below, server 120, consistent with the present invention, performs certain capacity planning operations via the capacity planning engine 300. Server 120 performs these operations in response to processor 220 executing software instructions contained in a computer-readable medium, such as main memory 230. A computer-readable medium may be defined as one or more memory devices and/or carrier waves. The software instructions are read into main memory 230 from another computer-readable medium, such as data storage device 250, or from another device via communication interface 280. The software instructions contained in main memory 230 causes processor 220 to perform capacity planning operations described below. Alternatively, hardwired circuitry may be used in place of or in combination with software instructions to implement processes consistent with the present invention. Thus, the present invention is not limited to any specific combination of hardware circuitry and software.

Client devices 110, servers 130, and ATE systems 140 have computing architectures similar to that described above in reference to FIG. 2 for server 120. In the preferred embodiment, access to data stored on servers 130 and ATE systems 140 are most vital to implementing the methods of the present invention. For example, storage device 250 of servers 130 may contain enterprise planning, business intelligence, and chip test requirements data accessible by client devices 110 and server 120 for use in the preferred embodiment of the present invention. Similarly, storage device 250 of ATE systems 140 may contain equipment configuration, operational status, and chip test requirements data accessible by client devices 110 and server 120 for use in the preferred embodiment of the present invention.

Agents and Methods

Figure 3:
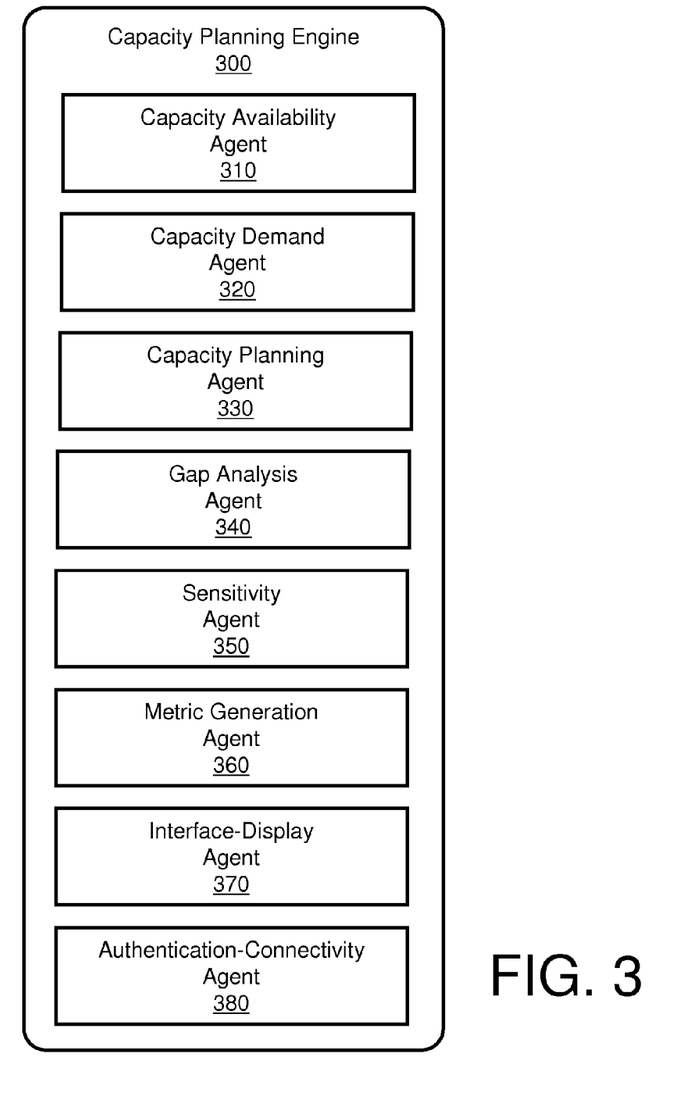
FIG. 3 illustrates the main agents of the present invention.

FIG. 3 illustrates capacity planning engine 300 comprised of software instructions that are collectively grouped into agents. Other software instruction groupings include services, applications, programs, procedures, classes, objects, subroutines, functions, web pages, scripts, queries, and the like. The agents shown include a capacity availability agent 310, a capacity demand agent 320, a configuration planning agent 330, a gap analysis agent 340, a sensitivity agent 350, a metric generation agent 360, an interface-display agent 370, and an authentication-connectivity agent 380. Capacity planning engine 300 performs capacity planning operations generally initiated by users 115 through client devices 110. Some operations may also be performed automatically on server 120 without any intervention by users 115. Such automatic operations will typically comprise the transmittal and retrieval of data from storage devices 250 of both servers 130 and ATE systems 140 over network 150. Data stored and used by engine 300 will typically be stored in a structured database format on storage device 250 of server 120.

Figure 4:
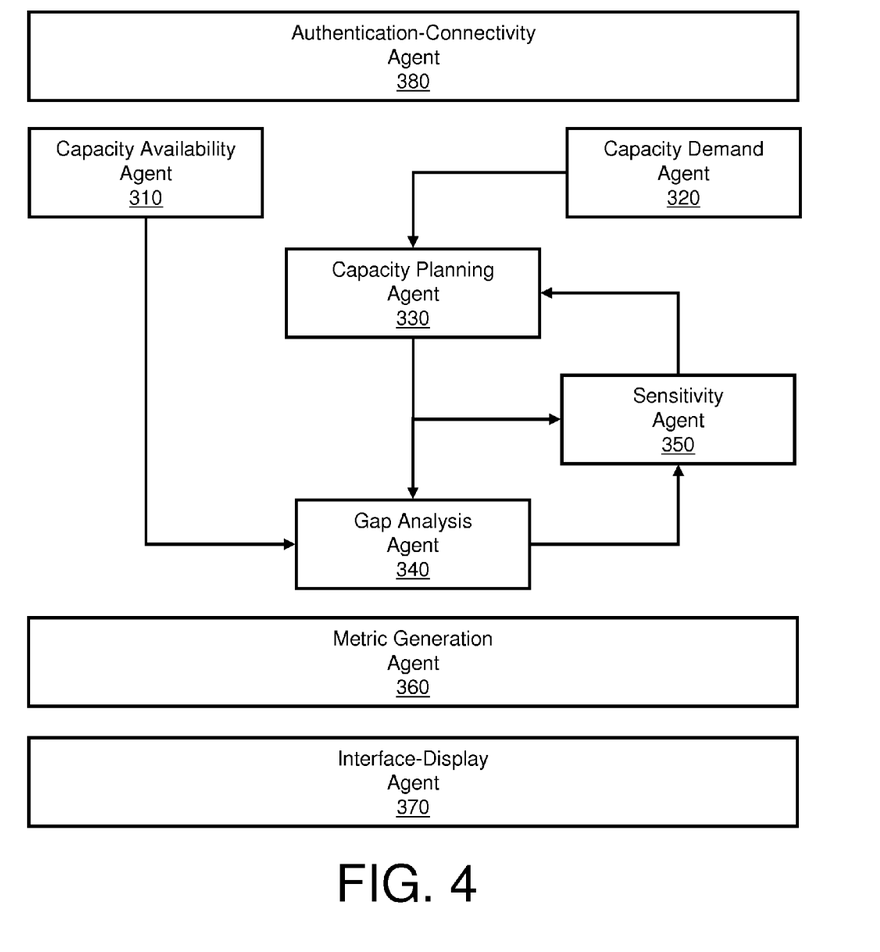
FIG. 4 illustrates the typical interaction of the agents of the present invention.

FIG. 4 illustrates the typical interaction of the agents of capacity planning engine 300. Authentication-connectivity agent 380 generally controls the scope of the accessibility of users 115 to agents and their features, as well as to certain objects external to engine 300. Agent 380 also ensures that all data used by engine 300 is secure and filtered according to its owner's specifications. Agent 380 typically performs its functions according to authentication information (e.g. a username and password) entered by users 115 through client devices 110.

The four core agents of capacity planning engine 300 are capacity availability agent 310, capacity demand agent 320, capacity planning agent 330, and gap analysis agent 340. Capacity demand agent 320 provides the main inputs to capacity planning agent 330, whose output in turn is compared to that of capacity availability agent 310 by gap analysis agent 340. The methods for these four agents are described in more detail below and in FIGS. 5 to 8.

Sensitivity agent 350 utilizes the outputs of capacity planning agent 330 and gap analysis agent 340 in an iterative fashion to highlight the sensitivities of a given plan to certain specified parameters. The sensitivity input ranges are stored within the capacity availability and capacity demand datasets for such attributes as test time, unit demand, and downtime. Sensitivity agent 350 reveals the variation of test capacity configuration, allocation, and procurement plans and related key metrics based on a selected sensitivity variable or group of variables.

The data stored and produced by agents 310, 320, 330, 340, and 350 are utilized by metric generation agent 360, which models and calculates various capacity-related metrics important to users 115. For example, agent 360 defines price (for the capacity provider) and cost (for the capacity specifier) estimates for a given test capacity configuration, allocation, and procurement plan provided by agent 330. The price and cost estimates can be grouped according to attributes—such as ATE type, chip name, customer, and the like—and can be broken down into financial accounting components such as depreciation and labor. Other key metrics produced by agent 360 include utilization level, maintenance time, configuration change rate, capital expenditure level, and demand serviceability level. Metric generation agent 360 will often directly interface with enterprise planning systems on servers 130 for integration with financial, accounting, or other business performance data.

Interface-display agent 370 provides the means by which users 115 can enter, view, and modify the data stored and produced by all agents of engine 300. In the preferred embodiment, this is specifically accomplished through a series of hypertext transfer protocol (HTTP) requests by users 115 on client devices 110 and corresponding HTTP responses delivered by agent 370 on server 120 via network 150. That is, agent 370 provides for users 115 a web-based interface to engine 300 accessible through web browser application program such as Microsoft Corporation's Internet Explorer™, Netscape Communication Corporation's Netscape Navigator™, and Apple Computer, Inc.'s Safari™.

In addition to providing an intuitive user interface to store and manage the large amounts of data used by engine 300, agent 370 generates interactive, textual and graphical displays of the test capacity configuration, allocation, and procurement plans and related metrics. More specifically, the interface-display agent 370 displays a timeline of each test cell comprising the test capacity being analyzed using color-coded bars highlighting such events as production time, maintenance time, idle time, and configuration changes. Key metrics—such as utilization level, maintenance time, and configuration change rate—are displayed for a user-specified set of test cells or individual test cell. User 115 can interact with the information displayed on client device 110 to make modifications to a given configuration, allocation, and procurement plan.

Figure 5:
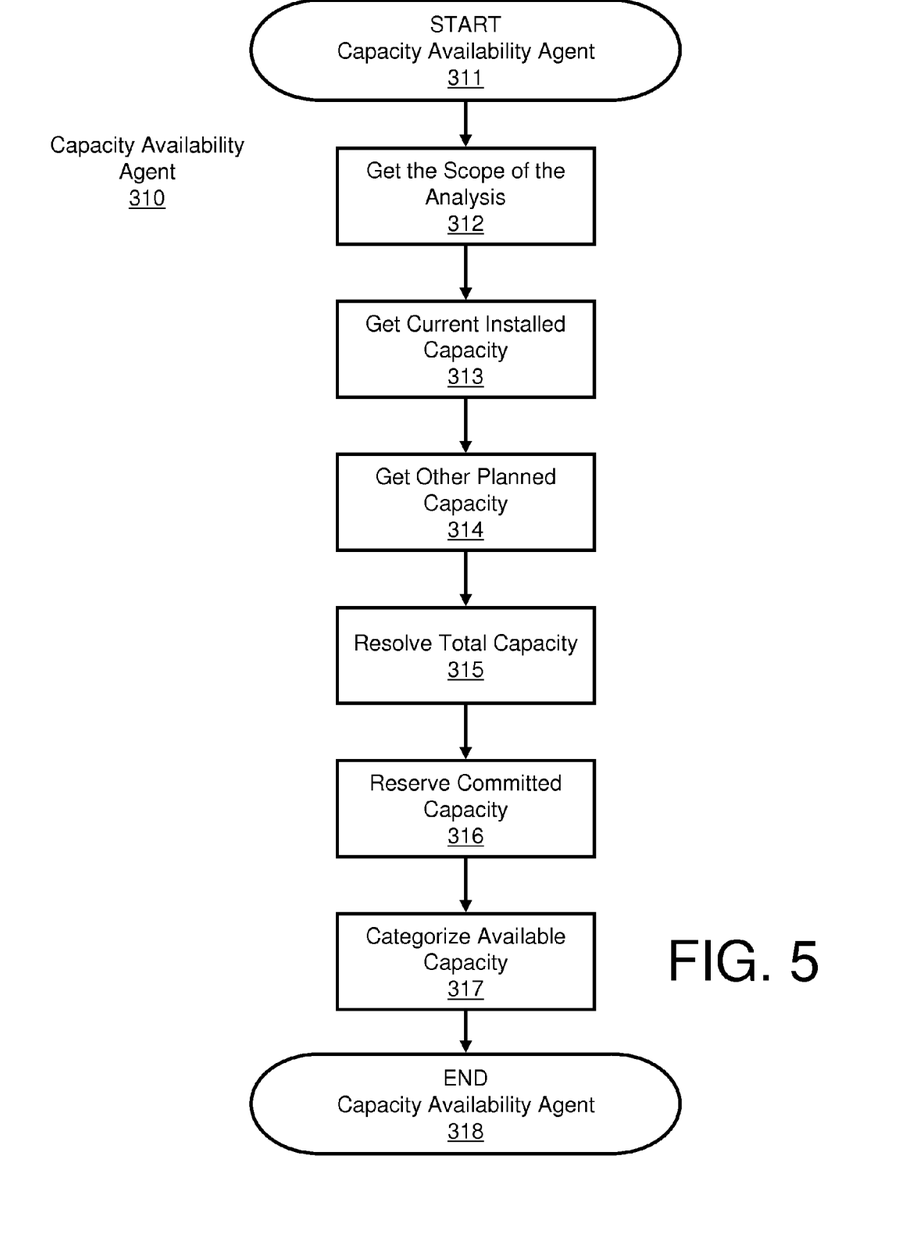
FIGS. 5-8 illustrate the methods of the four core agents of the present invention.

FIG. 5 illustrates the method of capacity availability agent 310, which describes available semiconductor test capacity, either existing or planned. The first step in agent 310 is to get the scope of the analysis 312. This is done via user 115 input at client device 110 using interface-display agent 370, or the passing of parameters from a calling procedure or agent. The scope is defined by attributes such as location, customer name, chip name, ATE type, and the like. Agent 310 will then get current installed capacity 313 by creating a dataset, from data stored on storage device 250 of server 120, that describes the installed capacity within the specified scope. The installed capacity data includes not only functional and temporal configuration attributes of the ATE but also functional and temporal attributes of related test cell equipment and consumables—such as material handlers, probers, and device interface boards—as well as other functional and temporal attributes such as those describing the disposition and state of the test capacity. Agent 310 may also directly query each ATE system 140 within the desired scope for its most current configuration. Agent 310 will then get other planned capacity 314 within the desired scope typically from enterprise planning system data, stored on storage device 250 of server 120, that describes recently purchased test capacity components that have yet to be installed or other test capacity component inventory. During step 314, agent 310 may interface with the enterprise planning systems on various servers 120 owned by test equipment and consumables suppliers to collect delivery information and other information. Agent 310 will then resolve total test capacity 315 by breaking down the capacity dataset according to various rules and the lowest levels of configurability for each capacity component. The resolution is generally at the level of independently transferable components. For ATE systems 140, for example, this could be at the resolution of a channel board, channel, or channel attribute (e.g. feature license). The resolution can also depend on operational constraints related to configuration frequency, geographical mobility, resource availability, and the like. Agent 310 will then reserve committed capacity 316, which defines and extracts a subset of the available capacity dataset based on previously made commitments described by data stored on server 120. Finally, agent 310 will categorize available capacity 317 by grouping the resolved capacity dataset according to location, ATE type, operational status, and/or other attributes. Interface-display agent 370 enables viewing of the resulting categorized available capacity dataset by user 115 at client device 110.

Figure 6:
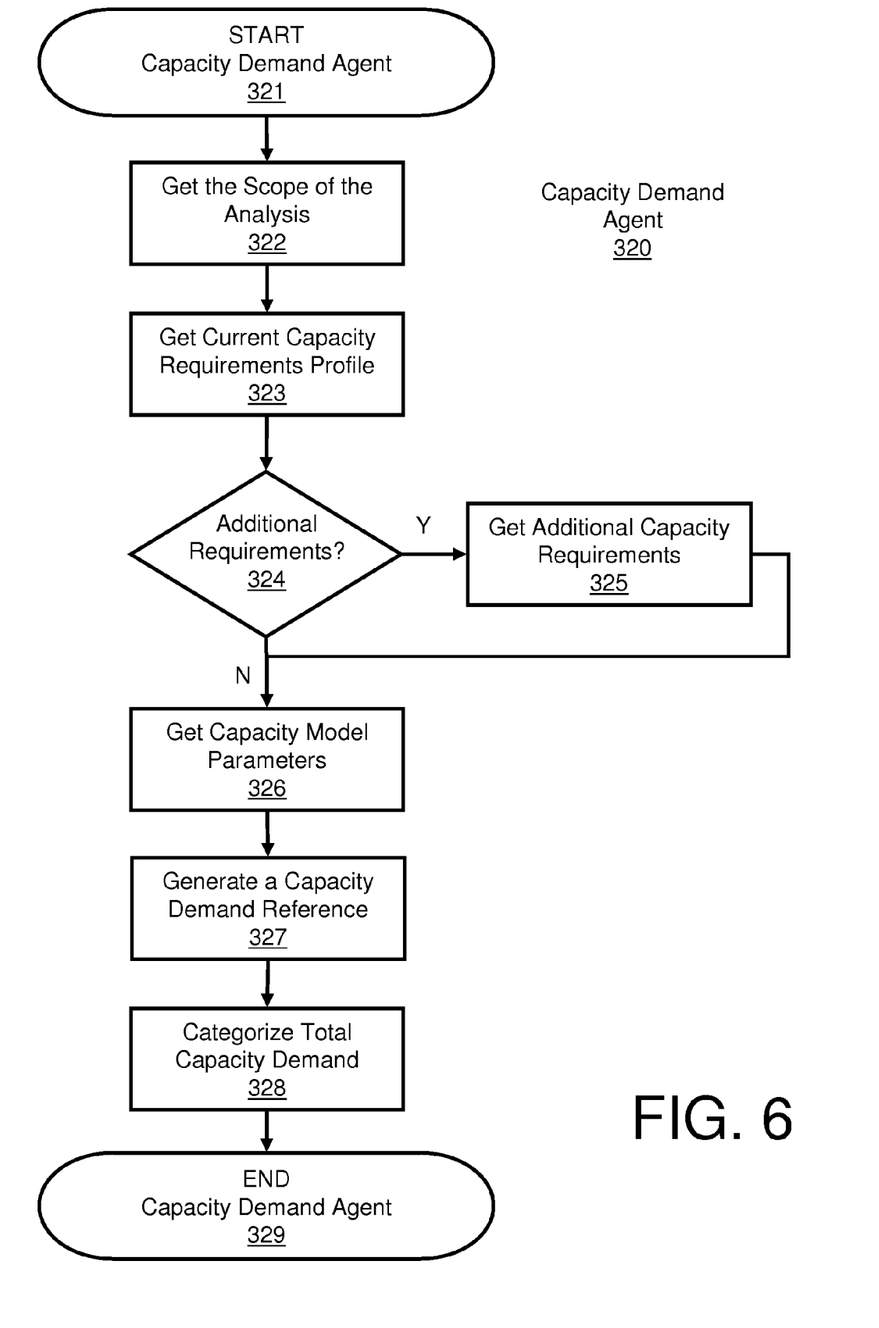

FIG. 6 illustrates the method of the capacity demand agent 320, which describes semiconductor test capacity requirements based on chip test requirement profiles and chip demand statements. The first step in agent 320 is to get the scope of the analysis 322. This is done via user 115 input at client device 110 using interface-display agent 370, or the passing of parameters from a calling procedure or agent. The scope is defined by attributes such as location, customer name, chip name, ATE type, and the like. Agent 320 will then get the current capacity requirements profile 323, by creating a dataset, from data stored on storage device 250 of server 120, that describes a comprehensive view of the test capacity requirements for the specified scope of chips. The capacity requirements data includes not only functional and temporal configuration attributes of the required ATE, but also functional and temporal attributes of required test cell equipment and consumables—such as material handlers, probers, and device interface boards—as well as other functional and temporal attributes such as those describing chip unit demand and desired manufacturing location. If additional requirements 324 are to be included in the dataset, agent 320 can get additional capacity requirements 325 automatically from some combination of systems on servers 130 (e.g. demand statements, test attributes, product test program, etc.) and ATE systems 140 (e.g. engineering system configuration), or manually by users 115 via interface-display agent 370 and existing capacity requirements data as a starting point as desired. When all test capacity requirements have been included in the dataset for the specified scope, agent 320 will get capacity model parameters 326 and generate a capacity demand reference 327, convolving each chip's unit demand with its test capacity requirements per unit. The resulting dataset describes the raw, baseline test capacity demand for the entire scope of chips specified. Finally, agent 320 will categorize total capacity demand 328 by grouping the demand reference dataset according to location, ATE type, provider name, and/or other attributes. Interface-display agent 370 enables viewing of the resulting categorized capacity demand dataset by user 115 at client device 110.

Figure 7:
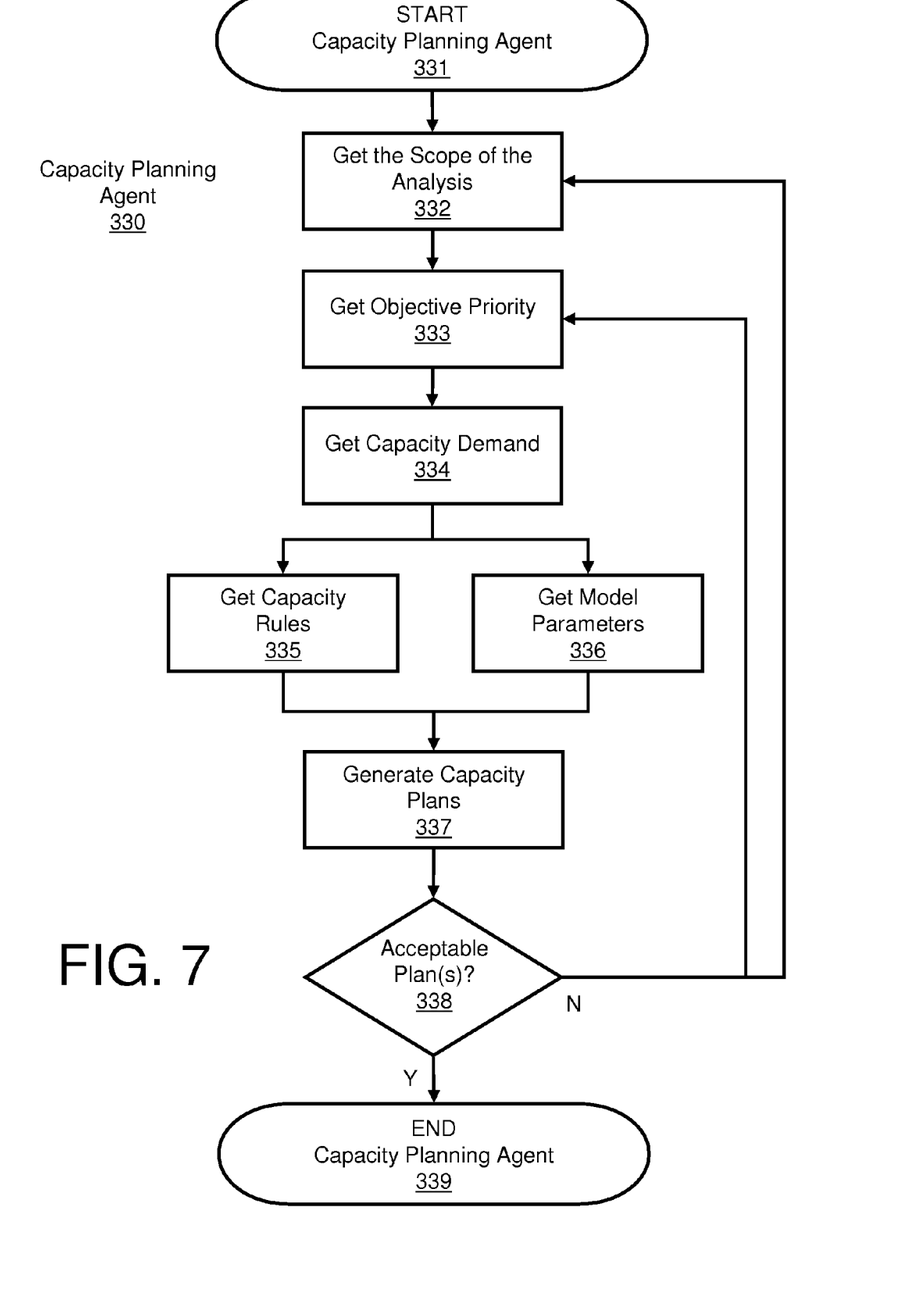

FIG. 7 illustrates the method of the capacity planning agent 330, which defines functional and temporal configuration, allocation, and procurement plans for a set of ATE systems and related test capacity components. The first step in agent 330 is to get the scope of the analysis 332. This is done via user 115 input at client device 110 using interface-display agent 370, or the passing of parameters from a calling procedure or agent. The scope is defined by attributes such as location, customer name, chip name, ATE type, and the like. Agent 330 will next get objective priority 333 which establishes the high-level criteria driving decisions and results within the algorithms of agent 330. Example objectives include demand serviceability, configuration stability, capital expenditure minimization, and the like. Agent 330 will then get capacity demand 334 from agent 320 according to scope 332. The final sets of input data are retrieved in get configuration rules 335 and get model parameters 336, describing capacity configuration constraints and specific capacity model parameters, respectively, for the current scope. The most significant step in agent 330 follows: generate capacity plans 337. In step 337, the data describing the objectives, demand, constraints, and parameters gathered from steps 332-336 are combined by a sophisticated set of algorithms to produce one or more test capacity configuration, allocation, and procurement plans. Each plan will comprise a dataset that defines the test capacity operational specifications—including ATE configuration, peripheral equipment, and chip-under-test—for each given unit of time. If acceptable plan(s) 338 are not produced, agent 330 will allow an adjustment to either the scope, objective priority, or both. Interface-display agent 370 enables viewing of the generated scenarios and associated metrics by user 115 at client device 110.

Figure 8:
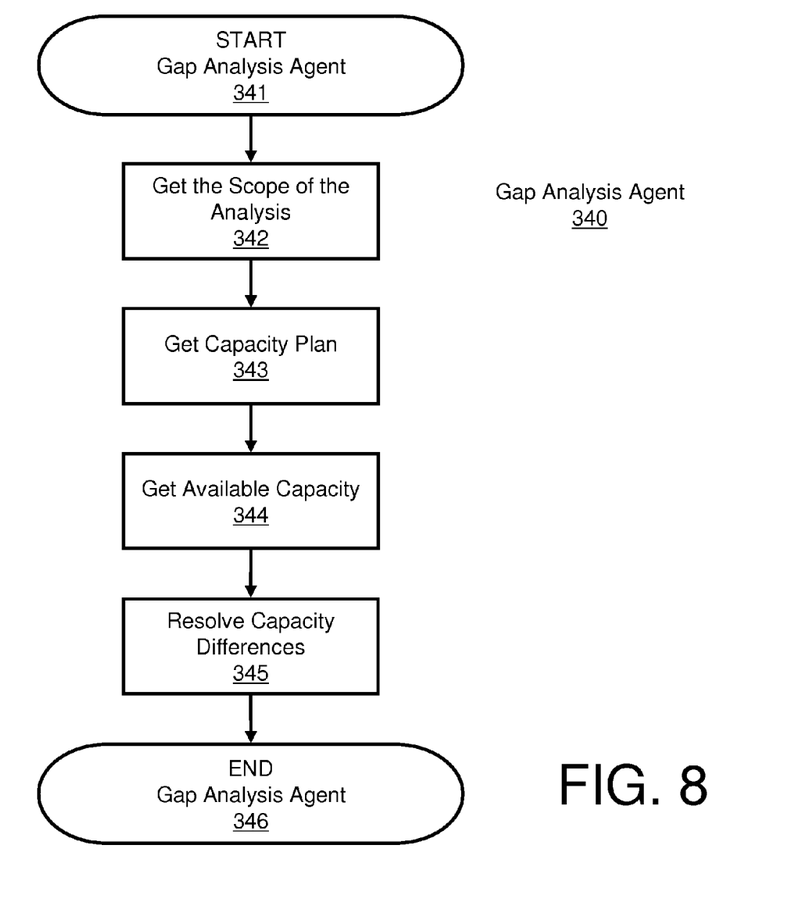

FIG. 8 illustrates the method of the gap analysis agent 340, which compares a given test capacity configuration, allocation, and procurement plan from capacity planning agent 330 to existing available test capacity from capacity availability agent 310. The first step in agent 340 is to get the scope of analysis 342. This is done via user 115 input at client device 110 using interface-display agent 370, or the passing of parameters from a calling procedure or agent. The scope is defined by attributes such as location, customer name, chip name, ATE type, and the like. Agent 340 will then get capacity plan 343 and get available capacity 344, typically from aforementioned agents 330 and 310, respectively. Agent 340 will next resolve capacity differences 345 by aligning and comparing the available capacity to the capacity plan at the lowest levels of configurability of capacity components. When more test capacity is needed than is available, step 345 generates a dataset describing the needed test capacity components at their lowest levels of configurability. This gap dataset can be grouped by such attributes as ATE vendor, ATE type, and manufacturing location using interface-display agent 370. Such summaries can be used to readily identify and procure test capacity components from appropriate vendors, possibly via various enterprise software applications running on servers 130. Finally, if available test capacity exceeds that which is required, agent 340 can similarly generate a dataset describing the excess capacity available, enabling efficient marketing of the capacity to potential specifiers typically within the operating environment of system 100.

General

While the description above of the present invention contains many specificities, these should not be construed as limitations on the scope of the invention, but rather as an exemplification of one preferred embodiment thereof. Accordingly, other modifications and variations may be possible in light of the above teachings. The embodiment above was chosen and described in order to best explain the principles of the invention and its practical application to thereby enable others skilled in the art to best utilize the invention in various embodiments and various modifications as are suited to the particular use contemplated. The appended claims and their legal equivalents are intended to determine the scope of the present invention which may include other alternative embodiments except insofar as limited by the prior art.

What is claimed is:

1. A method of determining a capacity plan for a plurality of test cells, comprising:

receiving data, at a processor, from a plurality of data sources using at least one manual input mechanism and at least one automatic input mechanism, the data relating to, at least in part, functional and temporal attributes of a chip demand statement, a chip test requirements profile, an available set of test cells, and a set of operational constraints; wherein the chip demand statement relates to, at least in part, a chip type and quantity to be tested over time; and the chip test requirements profile relates to, at least in part, a test cell capability required to test each chip type; and wherein each test cell includes automatic test equipment that is configurable with a configurable capability; the configurable capability comprising testing capability provided by at least one configurable component; the configurable capability further having configuration rules governing, at least in part, a configuration validity and a configurable component substitutability; and each configurable component being a hardware component or a software component relating to, at least in part, channel boards and feature licenses;

generating a demand reference, by the processor and in response to receiving the data, the demand reference being generated by aggregating the chip demand statement and the chip test requirements profile to determine functional and temporal attributes of a required set of test cells; wherein the demand reference further accounts for, at least in part, attributes describing the configurable capability of the automatic test equipment in the required set of test cells;

generating a configuration and allocation plan, by the processor and in response to receiving the data and further in response to generating the demand reference, the configuration and allocation plan being constrained by the set of operational constraints to determine functional and temporal attributes of a set of operational specifications for a planned set of test cells; wherein the set of operational specifications relates, at least in part, to a deployment of each configurable component associated with the automatic test equipment in the planned set of test cells for each unit of time; the configuration and allocation plan is further constrained by the configuration rules and by attributes describing a relative transferability of the configurable components; and the processor verifies that no configuration rule makes the configuration and allocation plan invalid;

resolving the data and the set of operational specifications, by the processor, the resolving producing functional and temporal attributes of the configurable capability at a lowest level of configurability; wherein the lowest level of configurability relates, at least in part, to a minimum resolution defined by all configurable components that can be independently transferred among the automatic test equipment; and identifying a gap, by the processor, between the planned set of test cells and the available set of test cells, the gap comprising needed and excess aspects of each test cell; wherein the needed and excess aspects include the configurable components associated with the automatic test equipment.

2. The method of claim 1 wherein the data further relates to, at least in part, attributes describing an analysis scope; wherein the analysis scope defines a subset of all available data.

3. The method of claim 1 wherein receiving the data further includes storing the data, by the processor, in a structured database format, the structured database format being independent of an original format of the data.

4. The method of claim 1 wherein resolving the data and the set of operational specifications further includes categorizing the data and the set of operational specifications, by the processor, the categorizing grouping the data and the set of operational specifications according to attributes relating to, at least in part, location, equipment type, chip type, and operational status.

5. The method of claim 1 wherein the method further comprises performing a sensitivity analysis, by the processor, the sensitivity analysis revealing a variability in the configuration and allocation plan as a selected variable within the data is varied across a range.

* * * * *